United States Patent [19]

Maw et al.

[11] Patent Number: 4,607,452

[45] Date of Patent: Aug. 26, 1986

[54] SEEDLING DETECTOR AND FERRET

[75] Inventors: Bryan W. Maw; Harold L. Brewer, both of Tifton, Ga.

[73] Assignee: The University of Georgia Research Foundation, Inc., Athens, Ga.

[21] Appl. No.: 623,399

[22] Filed: Jun. 22, 1984

[51] Int. Cl.⁴ .............................................. A01C 1/00
[52] U.S. Cl. .................................................... 47/1 R
[58] Field of Search ...................... 47/1 R, 73, 56, 74, 47/16, 14, 58, 1.7, 1.43, 1.4; 111/2; 250/222.1, 222.2, 223 R; 340/583, 580, 612, 619

[56] References Cited

U.S. PATENT DOCUMENTS

| | | | |
|---|---|---|---|
| 3,436,540 | 4/1969 | Lamorlette | 250/223 R |
| 3,530,372 | 9/1970 | Laukien | 324/318 |
| 3,852,914 | 12/1974 | Levengood | 47/58 |
| 4,166,948 | 9/1979 | Steffen | 250/214 B |
| 4,206,569 | 6/1980 | Randolph | 47/1.43 |
| 4,262,806 | 4/1981 | Drabs | 250/223 R |
| 4,266,674 | 5/1981 | Bell et al. | 209/536 |
| 4,279,328 | 7/1981 | Ahlbom | 250/222.1 |
| 4,408,295 | 10/1983 | Kavage et al. | 362/552 |
| 4,408,414 | 10/1983 | Lehle et al. | 47/58 |

Primary Examiner—Robert A. Hafer
Assistant Examiner—Bradley M. Lewis
Attorney, Agent, or Firm—Oblon, Fisher, Spivak, McClelland & Maier

[57] ABSTRACT

A device for detecting a seedling. A row of detectors determine the presence or absence of a seedling at positions in a two dimensional grid, one row at a time. A comb has teeth spaced to fit between rows of the seedlings. Each tooth carries a light source on one side and a light detector on the other. Each light detector receives light from the light source on the adjacent tooth. When a seedling is present, the light is interrupted. A memory stores the position of the present seedlings so that cells having no seedlings may be removed.

5 Claims, 3 Drawing Figures

SEEDLING DETECTOR AND FERRET

BACKGROUND OF THE INVENTION

1. Field of the Invention

This invention relates generally to a seedling detector and more specifically to an optical seedling detector mounted on the teeth of a comb between which teeth pass the seedlings.

2. Description of the Prior Art

A major agricultural business has developed around the growth of seedlings from seeds for transplanting purposes. The plants may be almost any species, but of special importance are vegetable and tree seedlings. Such seedlings are grown in greenhouses and when of a suitable transplant size are, shipped out for planting on farms or timberland. To facilitate handling, the seeds are placed in a small container having a suitable growth material with a large number, for example 200, of the containers being held by a tray. The tray may have a two dimensional grid of cells for holding the containers, for example 200 cells may be arranged in a pattern of 10 rows by 20 columns.

In order not to waste space in the greenhouse, it is economically important to have a seedling growing in each container. In the past, this was accomplished by planting two or more seeds together, thus increasing the probability that at least one would emerge per container. Unfortunately, this is a waste of seed and also requires surplus step of plucking out the extra seedlings. In addition, some containers would still have no seedling. Some devices, such as the one shown in U.S. Pat. No. 3,852,914, have been developed to test seeds before planting to get a better percentage of plants emerging. However, these attempts have not been completely successful.

Another method of avoiding the problem is to plant a single seed per container, and at a point in time after the plants have emerged, but before they are large enough for transplanting, to sort out those containers without emerged seedlings. The empty cells left in the tray may then be filled with containers having emerged seedlings so that every cell in the tray has a seedling. This procedure although technically successful, has been performed by hand and as a result has been time consuming and expensive.

Attempts at using machinery to perform this task have been only partially successful. While conveyor equipment for moving the trays and may be obtained by modification of existing equipment, the determination of the presence of a seedling has been difficult. This is especially true as the efficiency and speed of the other equipment increases, thus causing a bottleneck at this point in the assembly line.

Automatic detecting devices, especially optical detectors are well known for the detection and inspection of various items. However these items are much less fragile than young seedling plants and do not occur in a grid such as the tray of plants. U.S. Pat. No. 4,266,674 shows a light and photodetector arrangement for a pack of cigarettes which determines when a missing cigarette leaves a hole. U.S. Pat. No. 4,408,295 shows another arrangement of detectors to find an empty hole indicating a missing item. Since seedling trays hold the container even if the plant has not grown, these devices are not usable for such application. U.S. Pat. No. 4,166,948 shows a detector in each chute of a planter dispensing seed corn. However, this requires the item to fall through a chute which cannot be done with a tender seedling.

SUMMARY OF THE INVENTION

Accordingly, one object of this invention is to provide a novel seedling detector.

Another object of this invention is to provide an efficient and inexpensive seedling detector.

A further object of this invention is to provide a new and improved component of a seedling sorting device which is a seedling detector.

Another object of this invention is to provide a detector which moves between the rows of seedlings.

A still further object of this invention is to provide an optical detector for seedlings which is harmless to the plants and fast and efficient to use.

Briefly, these and other objects of the invention are achieved by providing a comb having teeth which fit in the space between rows of seedlings. Each tooth carrys a light source and detector for determining when a plant is present between the teeth. The positions of plants in a tray are noted and placed in a computer memory and are available for controlling sorting machines.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
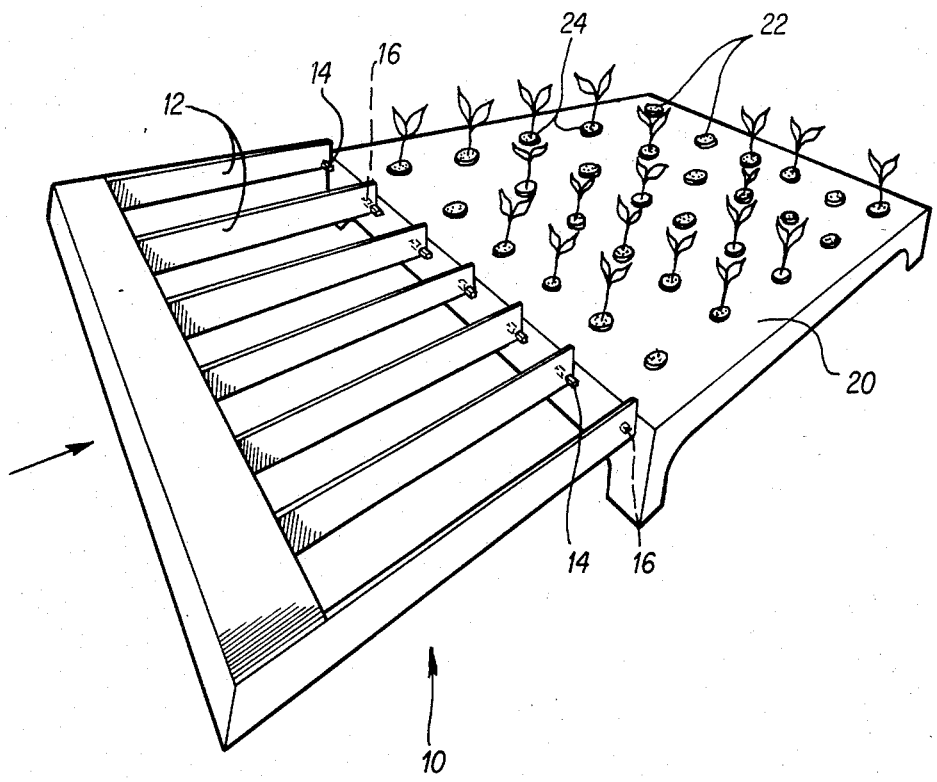
FIG. 1 is a perspective view of a first embodiment of the present invention.

Referring now to the drawings, wherein like reference numerals designate identical or corresponding parts throughout the several views, and more particularly to FIG. 1 thereof, wherein the present invention is shown as including a comb, generally indicated by 10. The comb includes a number of teeth 12 which are relatively long and thin members but which are also stiff and relatively strong. At the end of each tooth are mounted light sources 14 and light detectors 16. The light source on each tooth is aligned with the light detector on the adjacent tooth. The teeth are spaced apart a distance equal to the distance between columns of cells in a tray 20, but offset from the cells by half this distance so that the teeth are aligned with the spaces between plants.

The tray 20 contains a plurality of locations or cells arranged in a two dimensional grid of rows and columns (shown as 5 rows and 6 columns). Each cell carries a container in which a seed has been planted. In some of the containers 22, no seedling has emerged. In other containers 24, a seedling has emerged and is present.

Figure 2:
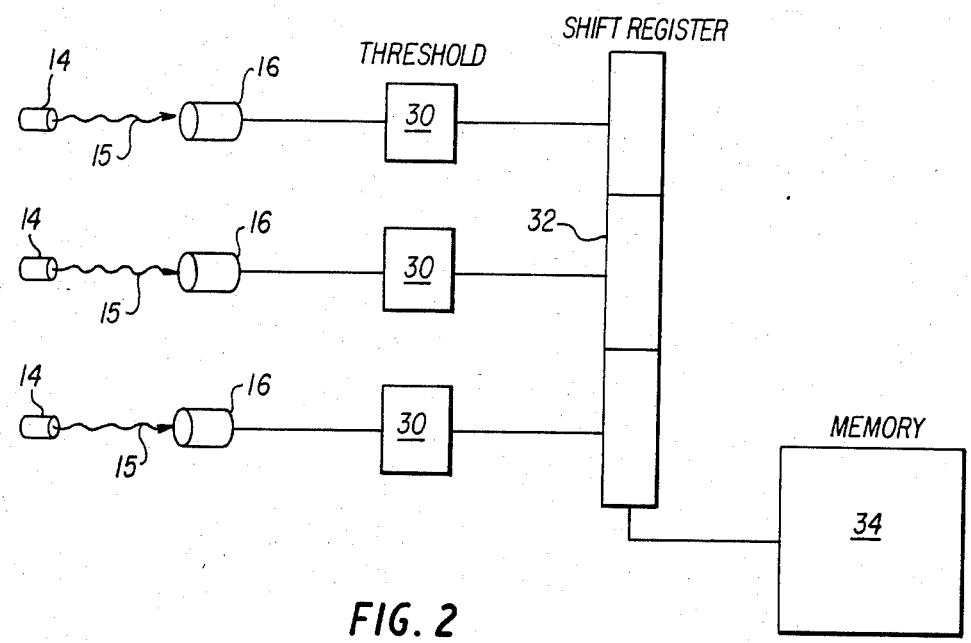
FIG. 2 is a block diagram of the present invention.

FIG. 2 is a circuit diagram of the present invention and shows photodetectors 16 receiving light rays 15 from light sources 14. The photodetectors produce a voltage signal depending on the intensity of light received: a low signal if light is not blocked and a high signal if light is blocked. This signal is received by a threshold device which holds the highest value signal received in a buffer shift register 32. After each row passes the detectors, the shift register is scanned for high values. These are emptied into memory 34 for storage and use.

In the operation FIG. 1, a tray 20 is brought into position in front of the comb 10. The comb is then moved in a direction indicated by the arrow at the left side of the figure. The teeth of the comb follow a path between the cells without touching the plants. However, if a seedling has emerged, it will prevent light from one of the light sources 14 from reaching the corresponding light detector 16 as the end of the teeth move past it. Thus, the comb scans an entire row of cells at a time. Each seedling in that row blocks its corresponding light detector as the comb moves past.

The decrease in light causes the output voltage signal of the photodetector to increase. Output voltages are continuously stored in the corresponding stage of buffer shift register 32 with the proviso that stored voltages cannot decrease. When the row is passed, the contents of the shift register are scanned; values above a threshold value are interpreted as a seedling present in a container. This information is stored in memory 34 and used to control a sorting mechanism to remove containers 22 having no seedlings. The shift register is reset then receives signals from the next row as the comb continues its travel.

Figure 3:
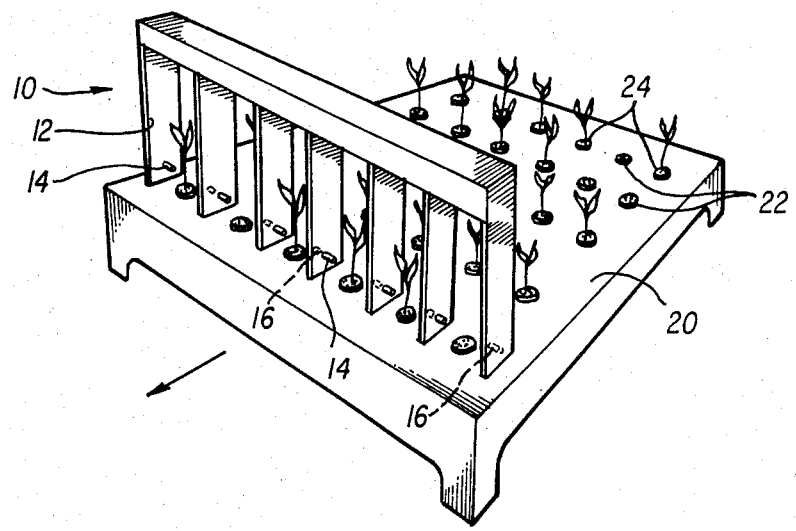
FIG. 3 is a perspective view of a second embodiment of the present invention.

A second embodiment of the invention is shown in FIG. 3 where the comb 10 has been aligned vertically and made stationary. The teeth 12 are still aligned to fit between columns of seedlings and carry light sources and detectors near their ends. In this embodiment, the comb need not move and the tray need not stop. The conveyor moves the tray in the direction indicated by the arrow so that the rows of seedlings move past the teeth of the comb and the photodetectors mounted thereon. The seedlings interrupt the light beam as it moves past and produce signals in exactly the same manner as in the first embodiment.

The second embodiment has the advantage of being faster with one tray being processed in about 5 seconds. The first embodiment may be advantageous when used with equipment that is already equipped with a reciprocating motion and hence easily adaptable. It may also be used where the detection is desired for trays still sitting on shelves in the greenhouse before sorting is desired. The comb may move up an down aisles between shelves and move in and out to detect seedlings.

In either embodiment, a height measurement is built into the detection operation. Since the detectors are mounted above the level of the tray, the seedling must be at least this tall to register. Thus seedlings which are undersized are rejected at the same time. The height may be easily adjusted by moving the entire comb up or down in either embodiment.

It is also possible to have the invention scan an entire tray at a time rather than a single row. In the first embodiment, several pairs of light sources and detectors could be spaced along each tooth so that moving the comb a distance of one row would cause all rows to be scanned. In the second embodiment, several combs could be placed in a row. In either case, a timing signal indicating the beginning of a scan would be necessary.

More involved determinations than mere presence are also possible with the addition of further detectors and different signal processing. For example, a series of photodetectors arranged vertically could determine the height of the plant in addition to presence. Other determinations such as the amount of foliage, thickness of the stem, type of plant, color, etc. could be accomplished using similar techniques.

The memory 34 has been described as having a separate shift register as a buffer for receiving a plurality of inputs. Any other electrical arrangement which prevents the overlapping and loss of signals from plural sources at the same time is equally acceptable. For example, a memory with a built in buffer, a serial interrogation circuit or a staggered delay for each input line would be suitable.

Other energy sources and detectors may be used, such as infrared or ultraviolet, as long as the seedlings interact with the energy beam.

The threshold value is adjustable and may be set by the operator to achieve the most efficient operation. It may also be adjusted for use with different kinds of plants.

The number of rows and columns of cells in a tray is variable and could be any number as long as the number of teeth in the comb is similarly changed. However, a standard tray now in use has 20 rows by 10 columns.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A detector device, for detecting seedlings suitable for transplantation in a tray having a two-dimensional grid of cells, with a container in each cell, said containers containing a growth medium and a plant seed, some of said plant seeds having grown into seedling plants and others of said plant seeds not having emerged, said detector device comprising:

a comb having a plurality of teeth with the spacing between teeth being equal to the spacing between rows of cells, each tooth being long and thin so that said teeth pass midway between rows of said cells without touching any of said plants;

a plurality of energy sources equal in number to the number of rows of cells, at least one of said sources mounted on a first side of each of said plurality of teeth;

a plurality of energy detectors equal in number to the number of rows of cells, at least one of said detectors mounted on a second side of each of said plurality of teeth so that each of said sources is aligned with a corresponding one of said detectors to provide an energy beam thereto;

said sources and detectors being mounted near the ends of said teeth;

a plurality of threshold devices having an associated adjustable threshold signal value, each of said threshold devices receiving said output from a corresponding one of said detectors and holding high or low values of said output signal from said detector;

a shift register for receiving said signal values from said threshold devices and temporarily holding said values; and a memory for storing said signal values;

said energy detectors also determining the height of said seedlings;

said tray and said comb being relatively movable so that each seedling plant passes between one of said sources and a corresponding one of said detectors to interrupt said energy beam, causing an output signal from said detector, whereby the presence of a seedling is detected so that cells without seedlings may be detected for removal and replacement.

2. A detection device according to claim 1 wherein said teeth extend horizontally and said comb is moved horizontally.

3. A detection device according to claim 1 wherein said teeth extend vertically and said comb is stationary.

4. A detection device according to claim 2 wherein said teeth are at least as long as said row of cells.

5. A device for sorting seedlings suitable for transplantation which are arranged in a tray having a two-dimensional grid of cells, with a container in each cell, said containers containing a growth medium and a plant seed, some of said plant seeds having grown into seedling plants and others of said plant seeds not having emerged, said sorting device comprising:
- a comb having a plurality of teeth with the spacing between teeth being equal to the spacing between rows of cells, each tooth being long and thin so that said teeth pass midway between rows of said cells without touching any of said plants;
- a plurality of energy sources equal in number to the number of rows of cells, at least one of said sources mounted on a first side of each of said plurality of teeth;
- a plurality of energy detectors equal in number to the number of rows of cells, at least one of said detectors mounted on a second side of each of said plurality of teeth so that each of said sources is aligned with a corresponding one of said detectors to provide an energy beam thereto;
- said sources and detectors being mounted near the ends of said teeth;
- a plurality of threshold devices having an associated adjustable threshold signal value, each of said threshold devices receiving said output from a corresponding one of said detectors and holding high or low values of said output signal from said detector;
- a shift register for receiving said signal values from said threshold devices and temporarily holding said values;
- a memory for storing said signal values;
- a sorting device controlled by said memory for removing containers whose seeds have not emerged and for replacing them with containers having emerged seeds;
- said energy detectors also determining the height of said seedlings;
- said tray and said comb being relatively movable so that each seedling plant passes between one of said sources and a corresponding one of said detectors to interrupt said energy beam, causing an output signal from said detector, whereby the presence of a seedling is detected so that cells without seedlings may be removed and replaced with cells having seedlings.

* * * * *